United States Patent [19]

Gutleber

[11] Patent Number: 4,475,215
[45] Date of Patent: Oct. 2, 1984

[54] PULSE INTERFERENCE CANCELLING SYSTEM FOR SPREAD SPECTRUM SIGNALS UTILIZING ACTIVE COHERENT DETECTION

[75] Inventor: Frank S. Gutleber, Little Silver, N.J.

[73] Assignee: The United States of America as represented by the Secretary of the Army, Washington, D.C.

[21] Appl. No.: 434,668

[22] Filed: Oct. 15, 1982

[51] Int. Cl.³ .......................... H04B 1/10; H04J 13/00
[52] U.S. Cl. ......................................... 375/34; 375/96; 375/102; 370/18
[58] Field of Search .................................. 370/18-22, 370/53, 69.1, 77, 85, 104, 116; 375/1, 25, 38, 96, 102-104; 340/346, 348, 349; 455/206, 284, 303-306; 364/604, 725, 728, 819, 826

[56] References Cited

U.S. PATENT DOCUMENTS

| | | | |
|---|---|---|---|
| 3,870,996 | 3/1975 | Miller | 375/102 |
| 4,293,953 | 10/1981 | Gutleber | 375/25 |
| 4,325,068 | 4/1982 | Mercer | 455/304 X |

OTHER PUBLICATIONS

Weik, Martin H., *Communications Standard Dictionary*, Van Nostrand Reinhold Company, 1983, pp. 56, 200.

Primary Examiner—Robert L. Griffin
Assistant Examiner—Albert W. Watkins
Attorney, Agent, or Firm—Anthony T. Lane; Sheldon Kanars; Jeremiah G. Murray

[57] ABSTRACT

A pulse interference cancelling system for spread spectrum signals utilized in a digital noise coded communications system. The system includes a first and second noise coded signal channel located in a noise coded signal receiver which also includes a demultiplexer for providing a pair of received noise coded signals which were initially generated, multiplexed and transmitted to the receiver. First and second coherent detector means are coupled to both signal channels, the first being directly coupled thereto so that no signal delay exists but the second is coupled to the two signal channels by means of respective first and second variable time delay circuits having a delay substantially equal to the bit width of each digital code as well as a vernier delay which is adapted to delay the phase of any received pulse interference in the respective channel so that it is exactly 180° out of phase with the same undelayed pulse interference. Signal summing means are coupled to the outputs of the two coherent detectors which operate to completely cancel the interference pulse signal while leaving the desired noise coded signal at its peak amplitude.

10 Claims, 3 Drawing Figures

PULSE INTERFERENCE CANCELLING SYSTEM FOR SPREAD SPECTRUM SIGNALS UTILIZING ACTIVE COHERENT DETECTION

The invention described herein may be manufactured, used and licensed by or for the Government for governmental purposes without the payment to me of any royalties thereon.

Cross Reference To Related Applications

This application is related to the following applications:

U.S. Ser. No. 423,751, entitled, "Pulse Interference Cancelling System For Spread Spectrum Signals", filed in the name of Frank S. Gutleber, on Sept. 27, 1982.

U.S. Ser. No. 433,761, entitled, "CW Interference Cancelling System For Spread Spectrum Signals Utilizing Active Coherent Detection", filed in the name of Frank S. Gutleber, on Oct. 12, 1982.

U.S. Ser. No. 413,953, entitled, "CW Interference Cancelling System for Spread Spectrum Signals", filed in the name of Frank S. Gutleber, on Sept. 1, 1982.

The assignee of the present invention is also the assignee of the inventions set forth in the aforementioned related applications.

Field of the Invention

This invention relates to noise code communications systems and more particularly to a pulse interference cancelling system therefor.

Background of the Invention

Noise coded communications systems are well known and are particularly desirable because they exhibit an immunity against self-interference and jamming. Noise coded means that the information is coded with a digital code that is "noise like" in that it will compress to an impulse when detected with a matched filter. In particular, one class of noise codes are known wherein pairs of coded signals termed "code mates" have autocorrelation functions which provide a peak output at a given time and outputs having the same magnitude but opposite polarities at all other times. When code mate signals, for example, are multiplexed, matched filter detected and linearly added, there is provided a lobeless impulse output of a relatively high amplitude at a given time and a zero output at all other times. Such codes and systems utilizing such codes are typically shown and described in U.S. Pat. No. 3,461,451, entitled, "Code Generator To Produce Permutations of Code Mates", which issued to F. S. Gutleber on Aug. 12, 1969; U.S. Pat. No. 3,634,765, entitled, "System To Provide An Impulse Autocorrelation Function ... Of One Or More Of Said Code Signals", which issued to F. S. Gutleber on Jan 11, 1962; and U.S. Pat. No. 3,908,088, entitled, "Time Division Multiple Access Communications System", which issued to F. S. Gutleber on Sept. 23, 1975.

In the above referenced related application entitled, "Pulse Interference Cancelling System For Spread Spectrum Signals", there is disclosed a pulse interference cancelling system located in a noise coded signal receiver which comprises a variable delay line and a linear adder coupled to the output of another linear adder which operates in combination with a pair of passive matched filter detectors to provide a lobeless impulse output signal. The delay line is varied to provide 180° phase shift for any pulse interference signals which occur in time coincidence with the lobeless impulse. The original and phase shifted pulse interference signal are added together in the linear adder and in the process cancel one another while leaving the lobeless impulse signal with no reduction in signal amplitude.

In the other related application, entitled, "CW Interference Cancelling System For Spread Spectrum Signals Utilizing Active Coherent Detection", there is disclosed a CW canceller comprised of a variable delay line and a linear adder coupled to the output of the front section of the multiplexed noise coded receiver which is followed by an active coherent detector comprised of a correlation detector including a multiplier and an integrator. The variable delay line provides a delay whose order of magnitude is substantially equal to the bit width of the multi-bit binary noise code utilized and is further varied until an input CW interference received along with the noise coded signal is delayed in phase by exactly 180°. The inverted interference signal and the non-inverted interference signal are summed together in the linear adder whereupon a complete cancellation of the interference signal occurs while causing no degradation in the noise coded signal which is subsequently detected and the desired communication signal retrieved in the active coherent detector.

Both of the above referenced related applications are meant to be specifically incorporated herein by reference.

Summary of the Invention

Accordingly, it is an object of the present invention to provide an improved noise coded communications system utilizing spread spectrum signals.

Another object of the present invention is to provide an improved noise coded communications system which eliminates pulse type interference signals.

Still another object of the present invention is to provide an improved noise coded communications system which eliminates pulse type interference in digital transmission systems utilizing spread spectrum signals while experiencing substantially no loss or degradation of the desired communications signal.

And yet another object of the present invention is to provide a pulse signal canceller for a noise coded communications system which utilizes active coherent detection.

Accordingly, these and other objects are achieved by means of a first and second noise coded signal channel located in a multiplexed noise coded signal receiver including demultiplexing means. First and second coherent detector means are coupled to both signal channels, the first directly coupled thereto so that no signal delay exists but the second is coupled to the two signal channels by means of respective first and second variable time delay circuits having a delay substantially equal to the bit width of each code bit and a vernier delay which is adapted to delay the phase of any pulse interference in the respective channel so that it is exactly 180° out of phase with the same undelayed pulse interference. Signal summing means are coupled to the outputs of the two coherent detectors which operate to completely cancel the interference pulse signal while leaving the desired signal at its peak amplitude.

Detailed Description of the Preferred Embodiment

Figure 1:
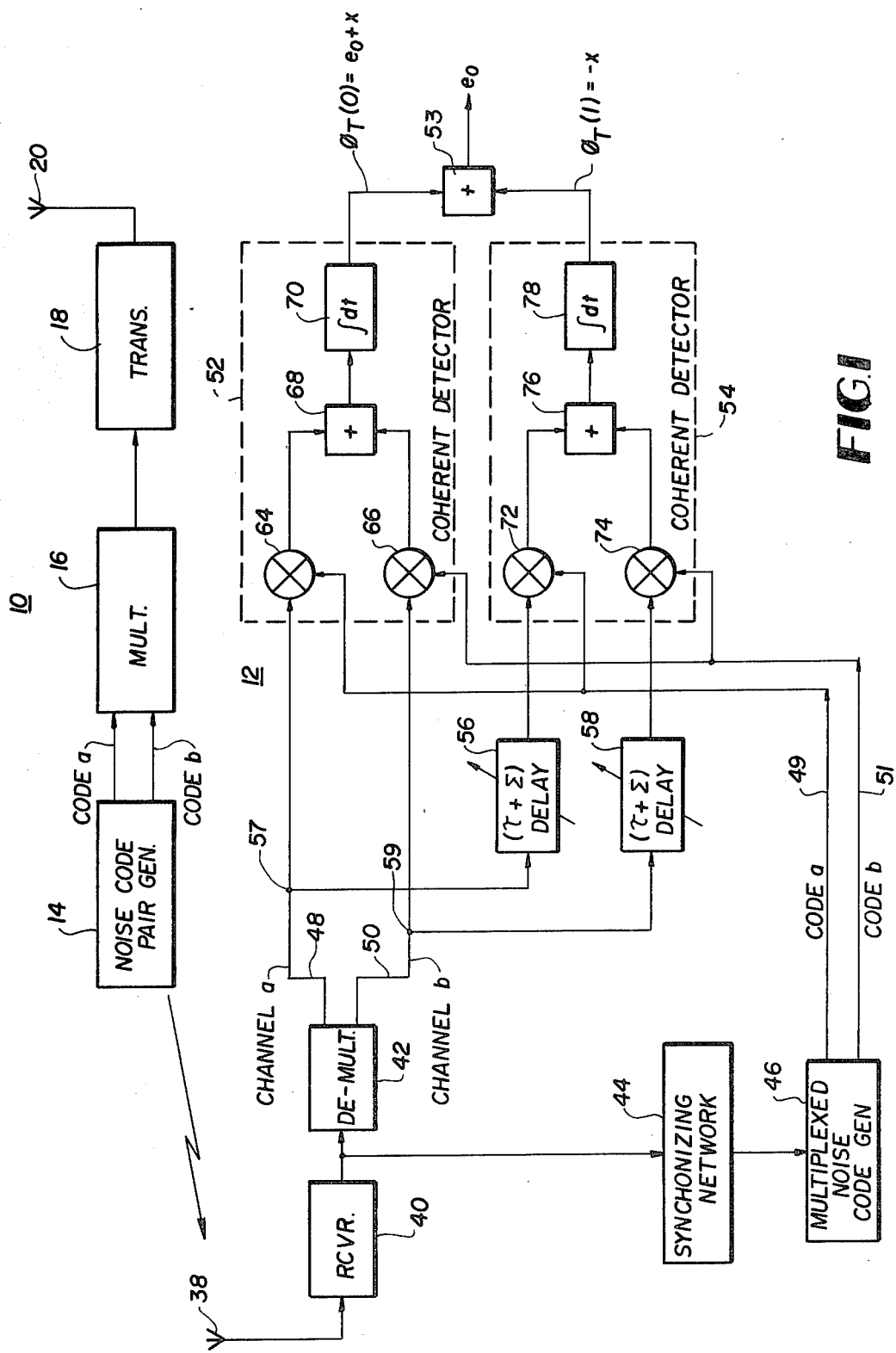
FIG. 1 is a functional block diagram of a noise coded communications system including a receiver including pulse interference canceller means in accordance with the subject invention.

Referring now to the drawings and more particularly to FIG. 1, reference numeral 10 denotes a multiplexed noise code transmitter which generates and transmits a noise code modulated RF signal to the receiver 12. The transmitter 10, moreover, includes a noise code pair generator 14 which is adapted to generate a pair of spread spectrum noise codes a and b which belong to a class of codes that possess a lobeless impulse autocorrelation function and are of the type shown and described in the aforementioned U.S. Pat. Nos. 3,461,451 and 3,634,765. The noise codes a and b generated by the noise code pair generator 14 are fed to a multiplexer 16 where they are orthogonally multiplexed and fed to an RF transmitter section 18 whose output is coupled to a radiating antenna 20.

Figure 2:
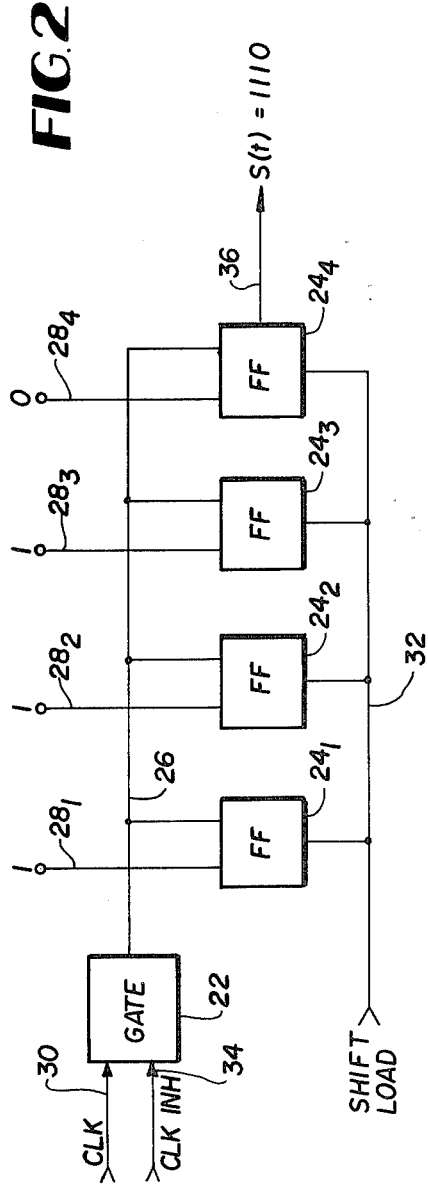
FIG. 2 is a functional block diagram illustrative of a typical active multi-bit binary code generator utilizable in the system shown in FIG. 1.

While passive type code generators are known wherein each pair of noise codes, for example, a and b, shown in FIG. 1 are generated by delaying an input pulse multiples of the code bit width with a tapped delay line device and thereafter summing all of the inputs with each other, FIG. 2 is illustrative of another type of code generator comprising an n bit shift register including, for example, a gate 22 and four flip-flops $24_1$, $24_2$, $24_3$ and $24_4$. The gate output line 26 commonly couples to one input of the flip-flops while a second input line $28_1$, $28_2$, $28_3$ and $28_4$ are respectively coupled to the other input of the flip-flops $24_1 \ldots 24_4$ for setting a binary input code. As is well known, a clock signal applied to the gate 22 by means of circuit lead 30 shifts the binary code through the shift register using shift load and clock inhibit control signals applied to circuit leads 32 and 34 so that the output line 36 outputs code, for example, code $a=s(t)=1110$ where the flip-flops $24_1$, $24_2$, $24_3$ and $24_4$ were initially set with a binary code of 1110. In order to generate code b, the apparatus shown in FIG. 2 would be duplicated with the exception that the binary control input supplied to the input leads $28_1$, $28_2$, $28_3$ and $28_4$ would be changed as required. For example, if code b is desired where $s(t)=0010$, the corresponding binary values would be set into the circuit leads $28_1$, $28_2$, $28_3$ and $28_4$.

The subject invention, however, is particularly directed to a receiver 12 which includes circuit means for cancelling pulse interference signals which would be received as a composite signal along with the multiplexed noise coded RF communications signal radiated from the antenna 20. The receiver 12 as shown in FIG. 1 includes a receiving antenna 38 which is coupled to a receiver front end section 40 whose output is commonly coupled to a noise code pair demultiplexer 42 and a synchronizing network 44 which in turn is coupled to and controls a local multiplexed noise code generator 46 which is adapted to generate, for purposes of correlation detection, a pair of noise codes identical to codes a and b generated by the noise coded pair generator 14 of the transmitter 10. Accordingly, the demultiplexer 42 provides a two channel output on signal busses 48 and 50 comprised of a composite signal including noise codes a and b, respectively, and also any interference pulse signals received. Further as shown in FIG. 1, signal busses 48 and 50 are directly connected to a first coherent detector 52. Additionally, they are connected to a second coherent detector 54 through a pair of variable time delay circuits 56 and 58 respectively connected to circuit nodes 57 and 59. The delay provided by each of the delay circuits 56 and 58 is equal to the bit width $\tau$ of each of the multi-bit codes a and b plus a vernier delay $\epsilon$, where $\epsilon < \tau$ in order to shift the phase of any interference pulse appearing in the channel a or b by exactly 180° so that it is inverted with respect to the same pulse interference appearing at circuit node 57 or 59. As will be shown, the second coherent detector 54 provides a coherent replica of the interference pulse exclusive of the desired signal while the first coherent detector 52 provides an output corresponding to the desired signal plus the interference pulse. By combining the two outputs of the coherent detectors 52 and 54 in the linear adder 53, the cancellation of the interference pulse occurs without reducing the level of the desired signal.

Figure 3:
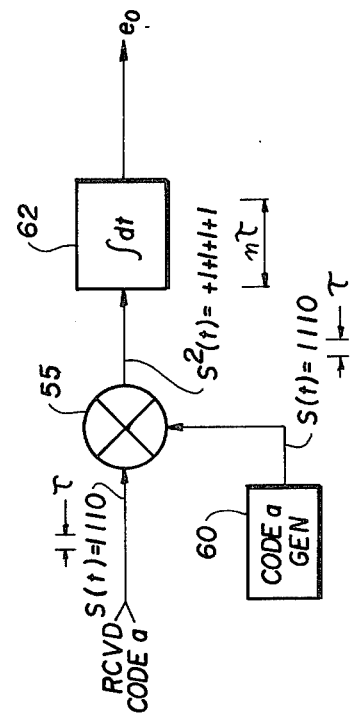
FIG. 3 is a functional block diagram illustrative of a typical active coherent correlation detector utilizable in the system shown in FIG. 1.

In order to understand the operation of the coherent detectors 52 and 54, reference will be first made to FIG. 3 which is illustrative of a single channel coherent detector also known as a correlation detector. Referring now to FIG. 3, the detector shown thereat is adapted to actively correlate a received code, for example code a, with a locally generated reference code a, where both the received code and the reference code are comprised of the same multi-bit code $s(t)=1110$ where the width of each bit is equal to $\tau$. Since the autocorrelation function equation $\phi_s(\tau)$ is defined by the equation $$\phi_s(\tau) = \int_{-\infty}^{\infty} s(t)\, s(t+\tau) dt, \qquad (1)$$

it can be seen that autocorrelation involves integration and multiplication. Moreover, the value of $\phi_s(\tau)$ which is equal to the autocorrelation function of $s(t)$ peaks at $\tau=0$ and is analogous to matched filter detection of a noise coded signal taught, for example, in the related application U.S. Ser. No. 423,751. Accordingly, as shown in FIG. 3, received code a is fed to a multiplier 55 along with a reference code a provided by code generator 60. In operation, the multiplier 58 translates all of the code bits, which are coincident in time and correlate with one another, into a binary value of $+1$ which are then integrated or summed over a time period $n\tau$ in an integrator 62 to provide an output signal $e_o$ of a maximum possible value. There is no time compression as in the case of passive matched filter detection since the output time duration of the processed signal is the same as that of the input coded signal. It is the bandwidth that is compressed by the time —bandwidth product, i.e. the number of code bits of the spread spectrum signal which results from the mechanics of active coherent detection.

With respect to the pair of coherent detectors 52 and 54 shown in FIG. 1, they are both illustrative of two channel detectors which include a pair of multipliers and an integrator but additionally including an adder interposed between the multipliers and integrators. More particularly, the coherent detector 52 is comprised of multipliers 64 and 66 having one input respectively coupled to signal busses 48 and 50 while their other inputs are respectively coupled to signal busses 49 and 51 which are coupled to the reference code a and code b fed from the local noise code generator 46. The outputs of the multipliers 64 and 66 are coupled to separate inputs of a linear adder 68 whose output in turn is coupled to the input of an integrator 70. In a like manner, the coherent detector 54 is comprised of a pair of multipliers 72 and 74 having one input respectively connected to the output of the variable time delay circuits 56 and 58 while their other inputs are coupled to the reference noise codes a and b appearing on signal busses 49 and 51. The outputs of the multipliers 72 and 74 are coupled to the two inputs of the linear adder 76 which has its output connected to an integrator 78.

Because the noise codes a and b are of the type which are capable of lobeless compression, the coherent detection of both the noise codes and any pulse interference signals present in either channel provides a cancellation of the interference pulse without degrading the amplitude of the desired signal due to the utilization of two coherent detectors where one of the detectors, for example, detector 54 coupled to the time delay circuits 56 and 58 outputs a coherent replica of the interference pulse shifted in phase by 180° and thus inverted but without the existence of the desired signal which when added to the output of the other coherent detector 52 having no input delay, the two detector output signals are summed to effect a cancellation of the interference pulse signal without regard to the signal level of the desired signal which was noise coded.

The following example is intended to illustrate this operation. Where, for example, code $a = 1110$ and code $b = 0010$ where 0 signifies a positive polarity pulse of unit amplitude while a 1 signifies a negative polarity pulse of unit amplitude, and since the codes are digital signals, the autocorrelation function can be expressed as, $$\phi_a(\tau) = \sum_{i=1}^{l=n-\tau} a_i a_{(i+\tau)} \quad (2)$$

Using equation (2), the autocorrelation function $\phi_a(\tau)$ of code a for $\tau = 0$ is, $$\phi_a(0) = \Sigma_a = \begin{array}{c} 1\ 1\ 1\ 0 \\ \times\ 1\ 1\ 1\ 0 \\ \hline +1\ +1\ +1\ +1 \end{array} = +4$$

where:
$1 \times 1 = +1$
$0 \times 0 = +1$
$1 \times 0 = -1$
$0 \times 1 = -1$
$\bullet = 0$ For $\tau = 1$, $\phi_a(\tau)$ becomes, $$\phi_a(1) = \Sigma_a = \begin{array}{c} 1\ 1\ 1\ 0 \\ \phantom{1}\ 1\ 1\ 1\ 0 \\ \hline \bullet\ +1\ +1\ -1\ \bullet \end{array} = +1$$

For $\tau = 2$, $\phi_a(\tau)$ becomes, $$\phi_a(2) = \Sigma_a = \begin{array}{c} 1\ 1\ 1\ 0 \\ \phantom{1\ 1\ }1\ 1\ 1\ 0 \\ \hline \bullet\ \bullet\ +1\ -1\ \bullet\ \bullet \end{array} = 0$$

For $\tau = 3$, $\phi_a(\tau)$ becomes, $$\phi_a(3) = \Sigma_a = \begin{array}{c} 1\ 1\ 1\ 0 \\ \phantom{1\ 1\ 1\ }1\ 1\ 1\ 0 \\ \hline \bullet\ \bullet\ \bullet\ -1\ \bullet\ \bullet\ \bullet \end{array} = -1$$

Furthermore, since an autocorrelation function is symmetrical, i.e. an even function, $\phi(-\tau) = \phi(\tau)$ or $\phi_a(-1) = +1$
$\phi_a(-2) = 0$
$\phi_a(-3) = -1$ In the same manner, the autocorrelation function of code b furthermore can be expressed as:

$$\phi_b(\tau) = \sum_{i=1}^{n-\tau} b_i b_{(i+\tau)} \quad (3)$$

Accordingly for $\tau = 0$ $$\phi_b(0) = \Sigma_b = \begin{array}{c} 0\ 0\ 1\ 0 \\ \times\ 0\ 0\ 1\ 0 \\ \hline +1\ +1\ +1\ +1 \end{array} = +4$$

For $\tau = +1$, $\phi_b(\tau)$ becomes, $$\phi_b(+1) = \Sigma_b = \begin{array}{c} 0\ 0\ 1\ 0 \\ \phantom{0}\ 0\ 0\ 1\ 0 \\ \hline \bullet\ +1\ -1\ -1\ \bullet \end{array} = -1$$

For $\tau = +2$, $\phi_b(\tau)$ becomes, $$\phi_b(+2) = \Sigma_b = \begin{array}{c} 0\ 0\ 1\ 0 \\ \phantom{0\ 0\ }0\ 0\ 1\ 0 \\ \hline \bullet\ \bullet\ -1\ +1\ \bullet\ \bullet \end{array} = 0$$

And for $\tau = +3$, $\phi_b(\tau)$ becomes, $$\phi_b(+3) = \Sigma_b = \begin{array}{c} 0\ 0\ 1\ 0 \\ \phantom{0\ 0\ 0\ }0\ 0\ 1\ 0 \\ \hline \bullet\ \bullet\ \bullet\ +1\ \bullet\ \bullet\ \bullet \end{array} = +1$$

The composite autocorrelation function comprises the linear summation of $\phi_a(\tau)$ and $\phi_b(\tau)$, hence $$\phi_T(\tau) = \phi_a(\tau) + \phi_b(\tau) \quad (4)$$

Thus at $\tau = 0$, $\phi_T(0) = +4 + 4 = +8$ $\tau = \pm 1, \phi_T(\pm 1) = +1 - 1 = 0$
$\tau = \pm 2, \phi_T(\pm 2) = 0 + 0 = 0$
$\tau = \pm 3, \phi_T(\pm 3) = -1 + 1 = 0$ The autocorrelation function of codes a and b, moreover, comprise a lobeless impulse function when they are comprised of code mate pairs belonging to a class of codes which meet the following requirements, namely, $$\phi_b(\tau) = -\phi_a(\tau) \quad (5)$$

for all $\tau \neq 0$

Consider now the reception of a strong interfering pulse having an amplitude of x where $x \gg 1$. Assuming, for example, that the interfering pulse occurs during the third code bit of code a, a composite signal is provided such that:

code $a = 1\ 1\ (1 + X)\ 0$

-continued code $b = 0\ 0\ 1\ 0$

Coherently detecting this composite signal in the undelayed signal channels a and b coupled to coherent detector 52 results in the following.

For code a, the autocorrelation function $\phi_a(\tau)$ at $\tau=0$ becomes, $$\phi_a(0) = \Sigma_a = \frac{\times \begin{array}{cccc} 1 & 1 & (1+X) & 0 \\ 1 & 1 & 1 & 0 \end{array}}{+1 +1 (+1+X) +1} = +4+X$$

For code b, the autocorrelation function $\phi_b(\tau)$ at $\tau=0$ becomes, $$\phi_b(0) = \Sigma_b = \frac{\times \begin{array}{cccc} 0 & 0 & 1 & 0 \\ 0 & 0 & 1 & 0 \end{array}}{+1 +1 +1 +1} = +4$$

Hence, where $\phi_{TT} = \phi_a(\tau) + \phi(\tau)$ $\phi_T(0) = 8+X$

Likewise, coherently detecting the composite input signal which is delayed by one bit in coherent detector 54 yields the following.

For code a, the autocorrelation function $\phi_a(\tau)$ where $\tau=1$ becomes, $$\phi_a(1) = \Sigma_a = \frac{\times \begin{array}{cccc} 1 & 1 & (1+X) & 0 \\ 1 & 1 & 1 & 0 \end{array}}{\circ +1 +1 (-1+X) \circ} = +1+X$$

For code b, the autocorrelation function $\phi_b(\tau)$ where $\tau=1$ becomes, $$\phi_b(+1) = b = \frac{\times \begin{array}{cccc} 0 & 1 & 0 & 0 \\ 0 & 1 & 0 & 0 \end{array}}{\circ -1 -1 +1 \circ} = -1$$

Hence, $\phi_T(1) = X$ which provides a coherent replica of the interference that is completely free of the desired signal. Further by adjusting the vernier portion of the delay $\epsilon$ being in delay lines 56 and 58, the interference becomes inverted, being equal and opposite to its value in the undelayed channels a and b. Following this, the simple linear addition of the two channel outputs $e_o + x$ and $-x$ from the coherent detectors 52 and 54 results in the desired signal $e_o$ being provided as, $$e_o = \phi_T(0) + \phi_T(1)$$
$$= 8 + X - X = 8$$

which is the amplitude of the desired signal without any interference.

It should also be noted that if the frequency of the interfering pulse is varied from pulse to pulse of an interfering pulse train, then, when desirable, a closed loop can be formed whereby the output interference would be monitored using an appropriate type of null detector, not shown, but for example taught in U.S. Pat. No. 4,027,264, entitled, "Phase Lock Loop Multi-Tone Interference Cancelling System", Frank S. Gutleber, May 31, 1977, and the variable delay $(\tau + \epsilon)$ continuously adjusted to maintain the interference at a null or zero level.

While there has been shown and described what is at present considered to be the preferred embodiment of the subject invention, the same has been made by way of illustration and not limitation. Accordingly, all alterations, modifications and changes coming within the spirit and scope of the invention, as defined in the following claims are meant to be included.

I claim:

1. A spread spectrum digital signal communications system, comprising:
    means for generating and transmitting a multiplexed noise coded communications signal formed as a continuous stream of bits;
    means for receiving a composite signal including said noise coded communications signal as a continuous stream of bits and any pulse interference signal;
    first active coherent detector means coupled to said receiving means, being directly connected to said composite signal and being operable to provide an output signal corresponding to the autocorrelated signal value of $\tau=0$ of said noise coded communications signal and said pulse interference signal;
    time delay circuit means coupled to said receiving means and providing a predetermined time delay of any said pulse interference signal to provide a 180° phase shift and invert a pulse interference signal included in said composite signal;
    second active coherent detector means coupled to said time delay circuit means, being coupled to said composite signal thereby and operable to provide an output signal corresponding to an inverted replica of said pulse interference signal without said noise coded communications signal;
    and
    linear adder means coupled to said first and second active coherent detector means for summing the outputs of said detector means which operates to cancel said interference pulse signal and provide an output of the desired signal of said noise coded communications signal free of pulse interference.

2. The communications system as defined by claim 1 wherein said multiplexed noise coded communications signal is comprised of a pair of continuous-stream multibit binary digital codes of substantially equal bit widths.

3. The communications system as defined by claim 2 wherein said pair of multi-bit digital noise codes possess an impulse autocorrelation function.

4. The communications system as defined by claim 3 wherein said time delay circuit means provides a signal delay of substantially one bit width of said noise codes.

5. The communications system as defined by claim 2 wherein said time delay circuit means comprises a variable time delay circuit means operable to delay said composite signal by a delay equal to the bit width of said noise coded communications signal and an additional incremental delay for providing a 180° phase shift of said pulse interference signal.

6. The communications system as defined by claim 1 wherein said first and second active coherent detector means each include multiplier circuit means and integrator circuit means coupled to said multiplier circuit means, said integrator circuit means providing said respective output signals from said detector means, said multiplier circuit means additionally having first input means coupled to said composite signal and second input means for receiving a reference noise coded signal, and additionally including means for generating a reference multiplexed noise coded signal corresponding to said transmitted noise coded signal, said reference noise coded signal being coupled to said second input means of said multiplier circuit means.

7. The communications system as defined by claim 6 and additionally including synchronizing circuit means responsive to said pair of multiplexed noise coded communications received by said receiving means and being coupled to said means for generating said reference multiplexed noise coded signal for controlling the generation of said pair of reference noise coded signals coupled to said first and second coherent detector means.

8. The communications system as defined by claim 7 wherein said multiplexed noise coded communications signal generated and transmitted comprises a pair of noise codes possessing an impulse autocorrelation function and said means for generating a reference noise coded signal comprises signal generator means for generating a pair of reference noise codes identical to said pair of noise codes transmitted.

9. The communications system as defined by claim 8 wherein said pair of multiplexed noise coded signals comprise a continuous-stream of digital signals of substantially equal bit widths and wherein said receiving means includes means for demultiplexing said multiplexed noise coded signal into first and second composite signals each including one respective noise coded signal of said pair;

wherein said first coherent detection means comprises a two channel detector including two multipliers each having a pair of inputs and an output, one like input of said two multipliers being respectively coupled to said first and second composite signals, and one like other input of said two multipliers being coupled to a respective matching reference noise coded signal of said pair of reference noise coded signals, linear adder means coupled to the output of said two multipliers for combining the two outputs from said multipliers, and integrator circuit means coupled to said linear adder means for providing said output signal; and wherein said second coherent detection means also comprises a two channel detector including two multipliers each having a pair of inputs and an output, one like input of said two multipliers being coupled to said first composite signal by said first variable time delay circuit means and one like input of the other of said two multipliers being coupled to said second composite signal by said second variable time delay circuit means, the other input of said two multipliers being coupled to a respective matching reference noise coded signal of said pair of reference noise coded signals, linear adder means coupled to the output of said two multipliers for combining the two outputs from said multipliers, and integrator circuit means coupled to said last recited linear adder means for providing said output signal.

10. The communications system as defined by claim 9 wherein said first and second variable time delay circuit means are operable to respectively delay said first and second composite signal by a delay equal to the bit width of said noise coded communications signal and an additional incremental delay for providing 180° phase shift and an inversion of an interference pulse signal included in said first and second composite signal relative to said pulse interference signal directly coupled to said first coherent detector means.

* * * * *